United States Patent
Chang et al.

(10) Patent No.: US 11,371,823 B1
(45) Date of Patent: Jun. 28, 2022

(54) MAGNETOELASTIC STRAIN SENSOR AND RADIO-FREQUENCY IDENTIFICATION TAG INCLUDING THE SAME

(71) Applicant: HRL LABORATORIES, LLC, Malibu, CA (US)

(72) Inventors: Chia-Ming Chang, Agoura Hills, CA (US); Hyok J. Song, Oak Park, CA (US); David Shahan, Malibu, CA (US); Geoffrey McKnight, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 197 days.

(21) Appl. No.: 16/829,859

(22) Filed: Mar. 25, 2020

Related U.S. Application Data

(60) Provisional application No. 62/888,249, filed on Aug. 16, 2019.

(51) Int. Cl.
*G01L 1/12* (2006.01)
*G01B 7/24* (2006.01)

(52) U.S. Cl.
CPC .............. *G01B 7/24* (2013.01); *G01L 1/125* (2013.01); *G01B 2210/58* (2013.01)

(58) Field of Classification Search
CPC ....... G01B 7/24; G01B 2210/58; G01L 1/125; G01L 3/102; G01L 3/103; G01L 9/16; G01L 23/145; G01L 23/223; H01L 41/12; H01L 41/125; G06K 19/0716; G06K 19/0717; G06K 19/0718
See application file for complete search history.

(56) References Cited

U.S. PATENT DOCUMENTS

| | | | |
|---|---|---|---|
| 5,086,651 A | 2/1992 | Westermo | |
| 5,222,399 A | 6/1993 | Kropp | |
| 5,343,759 A | 9/1994 | Hesthamar | |
| 5,385,054 A | 1/1995 | Kramer | |
| 5,392,654 A | 2/1995 | Boyle | |
| 5,437,525 A | 8/1995 | Bras | |
| 5,913,647 A | 6/1999 | Hodge | |
| 6,025,725 A * | 2/2000 | Gershenfeld | H01F 17/0006 324/652 |
| 6,622,567 B1 | 9/2003 | Hamel | |
| 7,698,949 B2 | 4/2010 | Akdeniz | |
| 9,483,674 B1 | 11/2016 | Fink | |
| 10,510,945 B1 * | 12/2019 | Langlois | C25D 5/627 |
| 2003/0200814 A1* | 10/2003 | Oh | G01L 1/125 73/779 |
| 2009/0278685 A1* | 11/2009 | Potyrailo | G01N 33/0073 340/572.1 |

FOREIGN PATENT DOCUMENTS

| | | | |
|---|---|---|---|
| AT | 519437 A1 * | 6/2018 | |
| WO | WO-2020215161 A1 * | 10/2020 | G01K 1/14 |

* cited by examiner

*Primary Examiner* — Herbert K Roberts
(74) *Attorney, Agent, or Firm* — Lewis Roca Rothgerber Christie

(57) ABSTRACT

A wireless radio-frequency identification (RFID) strain sensor including: a substrate; an antenna on the substrate; and an integrated circuit on the substrate and electrically connected to the antenna. At least one of the substrate and the antenna includes a magnetoelastic material.

16 Claims, 7 Drawing Sheets

MAGNETOELASTIC STRAIN SENSOR AND RADIO-FREQUENCY IDENTIFICATION TAG INCLUDING THE SAME

CROSS-REFERENCE TO RELATED APPLICATION

The present application claims priority to and the benefit of U.S. Provisional Patent Application Ser. No. 62/888,249, filed on Aug. 16, 2019 in the United States Patent and Trademark Office, the entire content of which is incorporated herein by reference.

FIELD

One or more aspects of embodiments of the present invention relate to a magnetoelastic strain sensor and a radio-frequency identification (RFID) tag including the magnetoelastic strain sensor.

BACKGROUND

Strain gauges are used to measure strain (e.g., deformation) of an object. Related art electronic strain sensors included a metallic foil pattern on an insulating flexible substrate (or backing). When the underlying object (also referred to as a "target object") on which the strain gauge was adhered deformed, the electrical resistance of the metallic foil pattern changes. This change in resistance through the metal foil pattern is measured to determine the strain in the underlying object.

Different types of electronic strain gauges have been developed. For example, semiconductor strain gauges, such as those including piezoresistors, microscale strain gauges used in microelectromechanical systems (MEMS), and integrated optical ring resonators have been developed and/or used as strain gauges.

As the use of higher-performance materials increases and useful lifetimes of materials, and machines and structures using such materials, such as cars, aircraft, bridges, etc., increases, there is a need for long-lifespan, maintenance free strain sensors that determine (or measure) strain in a target object and help determine when the target object (or target component, etc.) needs maintained or replaced. There is also a need for relatively cheap, reliable wireless strain sensors that can be embedded within machines and structure (e.g., placed in inaccessible or not easily accessible areas of machines and structures) to reliably monitor parts and portions of the machines and structures that are not readily accessible for inspection.

SUMMARY

Aspects of embodiments of the present invention are directed toward a magnetoelastic strain sensor and a radio-frequency identification (RFID) tag including the magnetoelastic strain sensor. According to embodiments of the present invention, a RFID tag includes a magnetoelastic material in such a way that enables the RFID tag to be used as a wireless, maintenance free strain sensor. As the RFID tag deforms along with an underlying target object onto which the RFID tag is adhered, the magnetic properties of the magnetoelastic material changes, and these changes vary the resonant frequency of the RFID tag antenna. This change in resonant frequency can be read by a RFID reader and used to determine the strain of the target object. In various embodiments of the present invention, the RFID tag may include a magnetoelastic antenna (or magnetoelastic coating on a related art antenna), a magnetoelastic substrate or portion thereof, a magnetoelastic sensor thereon, etc.

According to an embodiment of the present invention, a wireless radio-frequency identification (RFID) strain sensor includes: a substrate; an antenna on the substrate; and an integrated circuit on the substrate and electrically connected to the antenna. At least one of the substrate and the antenna includes a magnetoelastic material.

The magnetoelastic material may include Terfenol-D (TbxDy1-xFe2 (x~0.3)), galfenol (e.g., FexGa1-x), alfenol (e.g., FeGaB), Metglas (Fe81Si3.5B13.5C2), cobalt ferrite (CoFe2O4), and/or nickel (Ni).

The antenna may include a conductive metal, and the magnetoelastic material may be coated on the conductive metal.

The substrate may include an electrically non-conductive material.

The electrically non-conductive material may include polymers, ceramics, and/or glass-reinforced epoxy.

A first portion of the substrate may include the electrically non-conductive material, and a second portion of the substrate may include the magnetoelastic material.

The antenna may extend over the second portion of the substrate.

The RFID strain sensor may further include a capacitor electrically connected between the antenna and the integrated circuit.

The antenna may be planar.

According to another embodiment of the present invention, a radio-frequency identification (RFID) strain sensor includes: a substrate; an antenna on the substrate; an integrated circuit on the substrate and electrically connected to the antenna; and a magnetoelastic sensor on the substrate and electrically connected to the antenna and the integrated circuit.

The antenna may include a conductive metal, and the magnetoelastic sensor may include a magnetoelastic material.

The magnetoelastic sensor may include a plurality of rings of the magnetoelastic material.

The antenna may be connected to the magnetoelastic sensor at a plurality of points.

The RFID strain sensor may further include a capacitor electrically connected between the antenna and the integrated circuit.

According to another embodiment of the present invention, a wireless radio-frequency identification (RFID) strain sensor includes: a cylindrical magnetoelastic antenna; and an integrated circuit electrically connected to the antenna.

The antenna may have a conductor in solenoidal form.

The RFID strain sensor may further include a substrate, and the antenna may be on an outer surface of the substrate.

The substrate may have a cylindrical cross-section.

The substrate may be configured to be fitted around a pipe.

The magnetoelastic antenna may include a conductive metal base coated by a magnetoelastic material.

BRIEF DESCRIPTION OF THE DRAWINGS

These and other aspects and features of the present invention will be further appreciated and better understood with reference to the specification, claims, and appended drawings, in which:

DETAILED DESCRIPTION

Figure 1A:
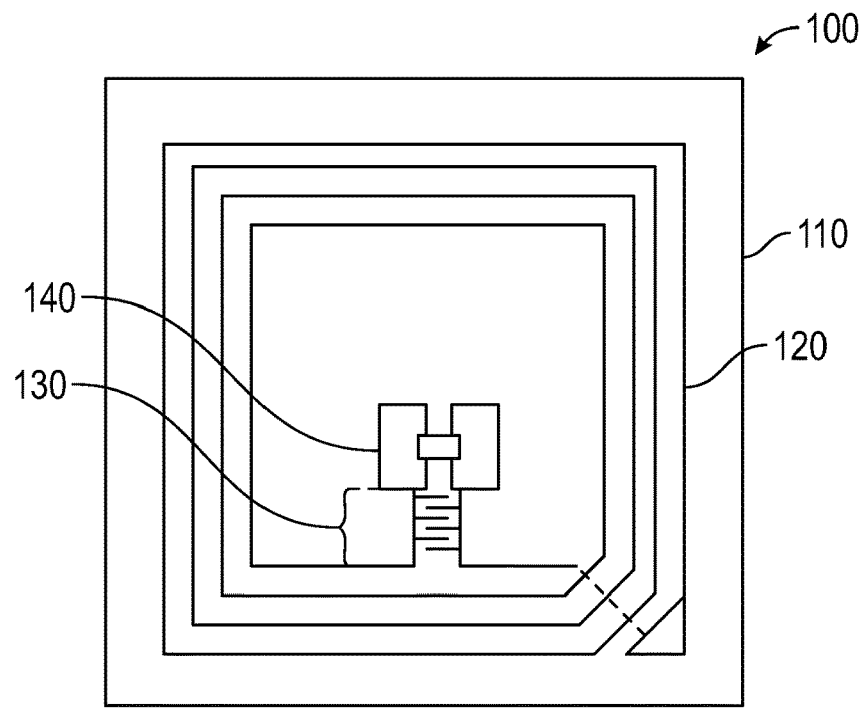
FIGS. 1A-1D show example embodiments of radio-frequency identification (RFID) tags according to embodiments of the present invention.

The detailed description set forth below, in connection with the appended drawings, is intended as a description of example embodiments of the present invention and is not intended to represent the only forms in which the present invention may be embodied. The description sets forth aspects and features of the present invention in connection with the illustrated example embodiments. It is to be understood, however, that the same or equivalent aspects and features may be accomplished by different embodiments, and such other embodiments are encompassed within the spirit and scope of the present invention. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

Referring to FIGS. 1A-1D, radio-frequency identification (RFID) tags including magnetoelastic strain sensors according to different embodiments of the present invention are shown. In FIG. 1A, a RFID tag 100 includes a substrate 110, a magnetoelastic antenna (e.g., a planar magnetoelastic antenna) 120, a capacitor (e.g., a printed capacitor) 130, and an integrated circuit (e.g., a RFID integrated circuit) 140.

Figure 5A:
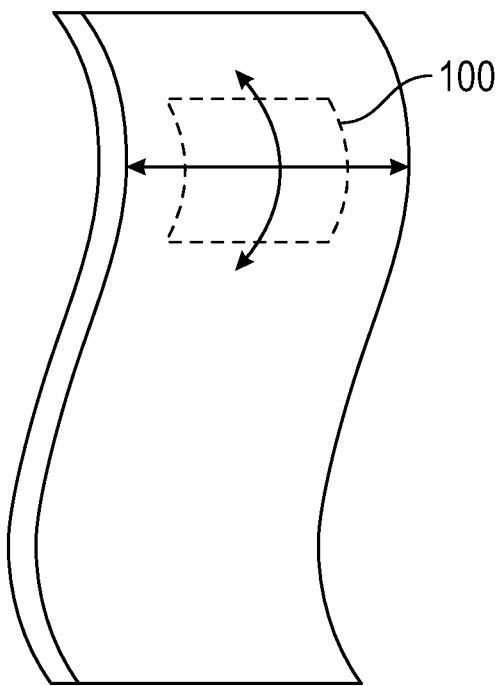
FIGS. 5A and 5B show different use examples of the RFID tags according to embodiments of the present invention.
Figure 5B:
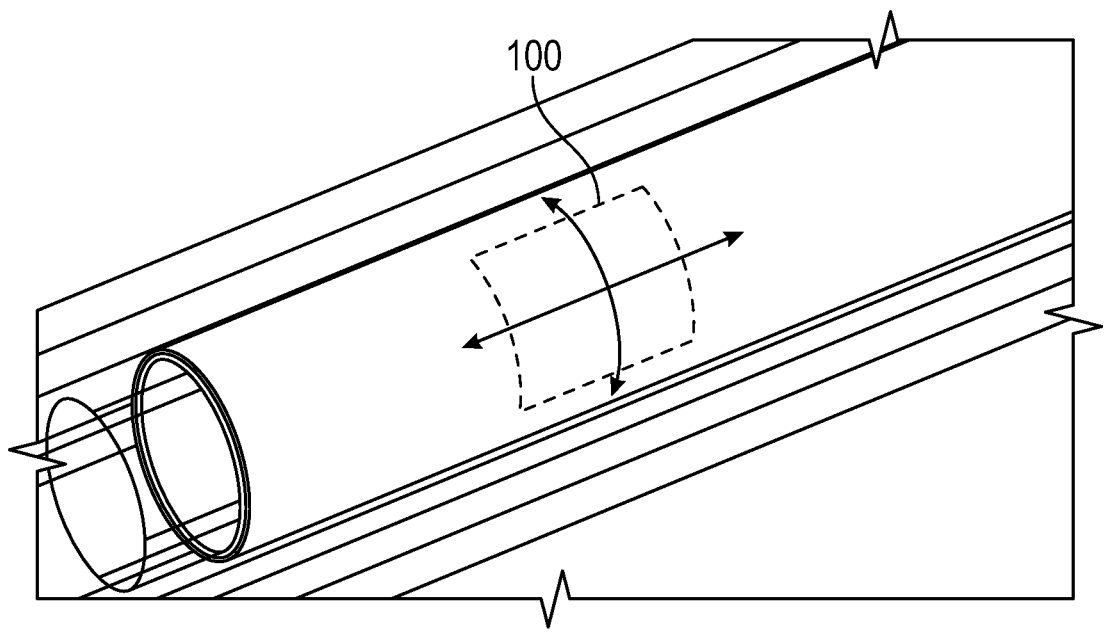

The substrate 110 may include (or may be formed of) a non-conductive (e.g., an electrically isolative) material, such as glass-reinforced epoxy, e.g., FR-4 board, ceramic-polytetrafluoroethylene laminate, e.g., 6010 board, a plastic material, such as polyimide and/or polyester, alumina ceramic, silicon, gallium arsenide, sapphire, and/or quartz. The substrate 110 may be flexible, allowing the RFID tag 100 to be attached to flexible sheets and/or objects (see, e.g., FIG. 5A) and to curved or rounded structures, such as pipes (see, e.g., FIG. 5B).

Generally, a RFID tag may be active (or battery powered), battery-assisted, in which a battery is included but the RFID tag is only activated in the presence of an emitting RFID reader, or passive. The passive RFID tag does not include a battery; instead, it relies on power (e.g., radio power) received from an emitting RFID reader to operate. In this way, passive RFID tags can benefit from being relatively maintenance free. The RFID tag 100, according to embodiments of the present invention, may be a passive RFID tag, but the present invention is not limited thereto.

Figure 6A:
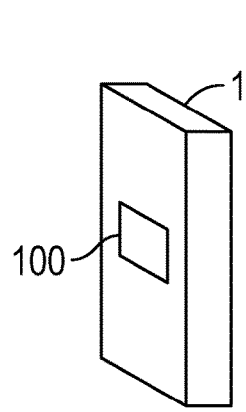
FIGS. 6A-6C show different use examples of RFID tags according to embodiments of the present invention.
Figure 6B:
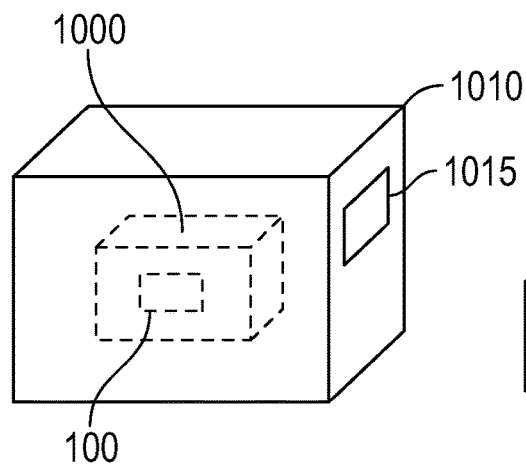
Figure 6C:
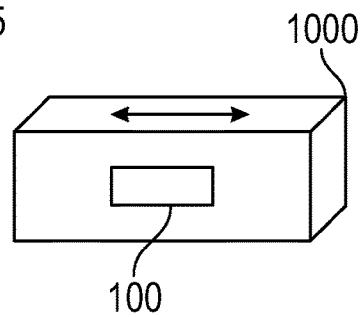

When the RFID tag 100 is passive (e.g., when the RFID tag 100 does not include a battery), it may be considered a maintenance-free (and/or non-serviceable) component that does not require any regular maintenance. Thus, the RFID tag 100 may be well-suited for conditions in which strain measurements of buried or otherwise inaccessible target component 1000 (see, e.g., FIGS. 6A and 6B) is desired, such as aircraft fuselage panels, and/or in cases where the target component 1000 is in motion (see, e.g., FIG. 6C). In these cases, the RFID reader can read the strain measurement through an intermediate object or through the object being measured itself 1000 (called direct penetration) (see, e.g., FIG. 6A) or, when the target object 1000 is enclosed by a surrounding structure 1010, an access panel or window 1015 may be formed in the surrounding structure 1010 to improve reception between the RFID tag 100 and the RFID reader (see, e.g., FIG. 6B).

The magnetoelastic antenna 120 may include (or may be formed of) any suitable magnetoelastic material, examples of which include Terfenol-D ($Tb_xDy_{1-x}Fe_2$ (x~0.3)), galfenol (e.g., $Fe_xGa_{1-x}$), alfenol (e.g., FeGaB), Metglas ($Fe_{81}Si_{3.5}B_{13.5}C_2$), cobalt ferrite ($CoFe_2O_4$), and nickel (Ni). In related art examples, a RFID tag antenna generally includes (or is made of) simple conductive metals, such as copper (Cu) or silver (Ag).

The capacitor 130 may include (or may be made of) the same material as the magnetoelastic antenna 120 or may include (or may be formed of) a different material. For example, the capacitor 130 may include (or may be formed of) copper (Cu). The capacitance value of the capacitor 130 may be suitably tailored to change the nominal resonance frequency of the sensor coil (e.g., of the magnetoelastic antenna 120).

The RFID integrated circuit (hereinafter referred to as the RFID IC) 140 is an integrated circuit that stores and processes information and that modulates and demodulates radio-frequency (RF) signals. The RFID IC may include non-volatile memory to store, for example, a unique identification code, and logic circuitry to process and transmit sensor data.

In use, a RFID reader generates (e.g., outputs) a radio signal (e.g., an encoded radio signal or radio-frequency (RF) signal) that interrogates the RFID tag (an "interrogating signal"). The RFID tag receives the interrogating signal and respond by encoding the receiving interrogating signal with its identification code (if present) and other relevant information.

Different from related art RFID tags, the RFID tag 100 according to an embodiment of the present invention can additionally be used to measure the strain of a target object (e.g., an object onto which the RFID tag 100 is attached). The magnetoelastic material of the magnetoelastic antenna 120 is strain-sensitive in that it, in response to the strain of the target object (e.g., as the RFID tag 100 deforms due to deformation of the target object), the magnetic permeability of the magnetoelastic material changes, thereby changing (or varying) the inductance and resonance frequency of the magnetoelastic antenna 120. As will be further described below, a RFID reader (e.g., a specially-calibrated RFID reader) can detect the change in the resonance frequency (e.g., the resonance shift) of the magnetoelastic antenna 120, which is caused by the change in the magnetic permeability and internal inductance of the magnetoelastic material.

More specifically, a magnetoelastic material exhibits coupling (e.g., demonstrates or exhibits a relationship) between magnetization and strain. This coupling manifests in the form of the Villari effect. The Villari effect is an effect in which the material magnetization changes or varies in response to applied deformation. This coupling allows resonances to be remotely excited by an oscillating magnetic field. The magnetic field, due to the induced vibrations, is detected by a receiving coil or antenna. The resonant characteristics can be generally determined from the received voltage by using either a frequency domain method or a time domain method.

In the frequency domain detection method, a range of frequencies is swept by the transmit coil while the receive coil detects a response from the target device (e.g., the device under test). The transmit and receive circuits are synchronized to operate at substantially identical frequencies at a given instance of time. The voltage detected by the receive coil shows a maximum at the device resonant frequency. A single coil may also be used for resonant frequency detection. The mutual induction between the coil and the device and, thus, the effective impedance of the coil, is dependent on the frequency response of the device. The impedance of the coil exhibits a peak at the device resonant frequency.

In the time domain detection method, an incident magnetic impulse is used to excite the resonant device, following which the ring-down oscillations are measured. Excitation and detection may be performed by using separate coils or a single coil that switches between transmit and receive circuits. The ring-down (e.g., the ring-down oscillations) occurs at the device resonant frequency and may be measured by using Fourier analysis or frequency counting techniques.

In one example and referring back to FIG. 1A, when an interrogating radio signal is imposed on the magnetoelastic antenna 120, which acts as an inductive sensor coil, a radio-frequency (RF) current is induced in the magnetoelastic antenna 120 and causes (e.g., generates) a magnetic field. The magnetic field generated by the magnetoelastic antenna 120, which is produced by the induced current, interacts with the magnetization of the magnetoelastic antenna 120 to cause the magnetic dipole moments to align with the applied field. This field interaction with the magnetoelastic antenna 120 causes a change of inductance of the magnetoelastic antenna 120. Because the strain level (e.g., the strain imparted on the magnetoelastic antenna 120) is directly related to the inductance of the magnetoelastic antenna 120, the strain in the target object (e.g., the object onto which the RFID tag 100 is attached) can be quantified by measuring the inductance shift in the magnetoelastic antenna 120, which acts as a resonant circuit.

Figure 3:
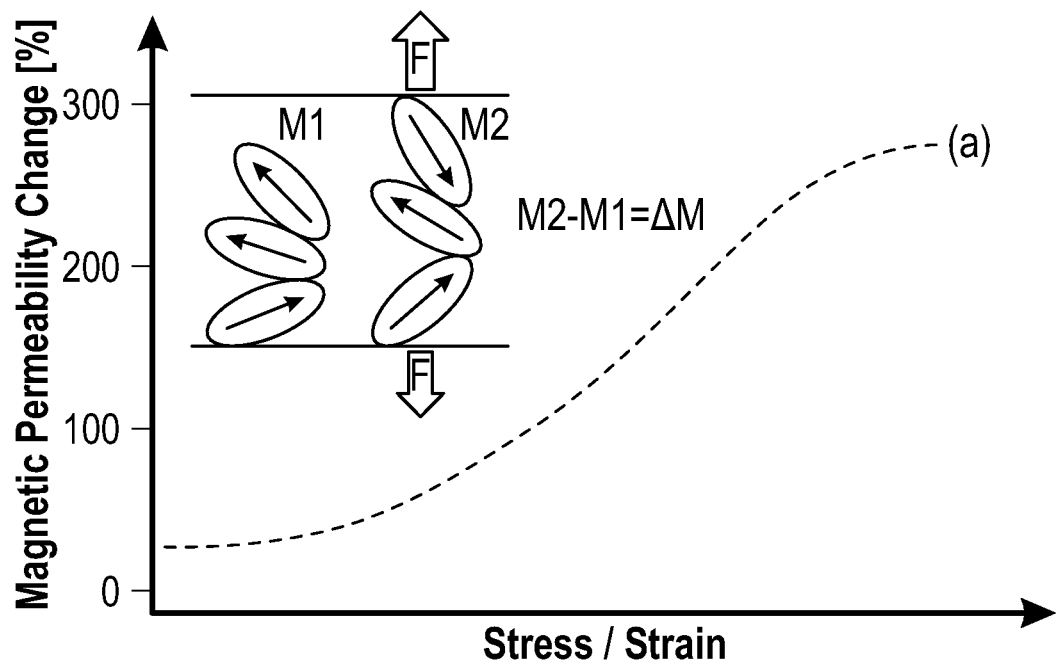
FIG. 3 is a graph illustrating the relationship between stress/strain of a magnetoelastic material and the change in its magnetic permeability.

FIG. 3 is a graph showing a relationship between the stress/strain imparted onto a magnetoelastic material and the corresponding change in magnetic permeability of the magnetoelastic material. As can be seen, the stress/strain applied to the magnetoelastic material changes the relative magnetic permeability of the magnetoelastic material during the process of material deformation. The variation of the magnetoelastic materials' magnetization due to the applied mechanical load changes the magnetostrictive strain until reaching a saturation value (a). Internally, ferromagnetic materials have a crystal structure that develops local magnetic domains, each of which is a region of uniform magnetic polarization. When a mechanical load is applied, the boundaries between the domains shift and the domains rotate; both of which cause a change in the material's magnetization. It is this change in magnetization that can be measured and quantified by a RFID reader to quantify the underlying strain of a target object.

Figure 2A:
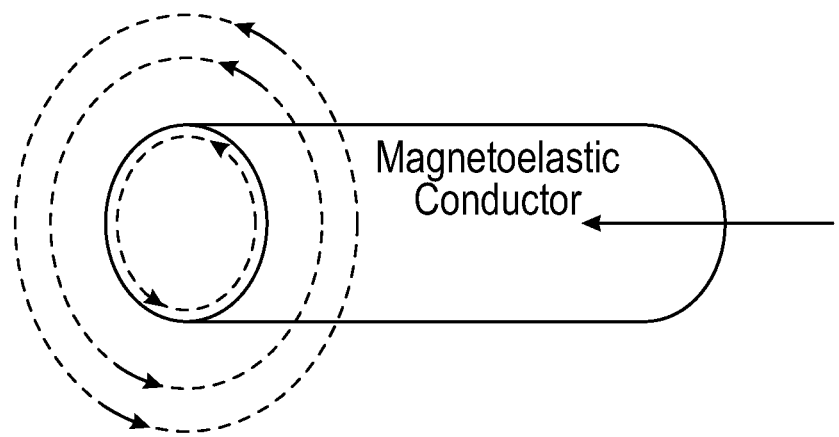
FIGS. 2A-2C illustrate inductance principles on which the magnetoelastic strain sensors according to embodiments of the present invention operate.
Figure 2B:
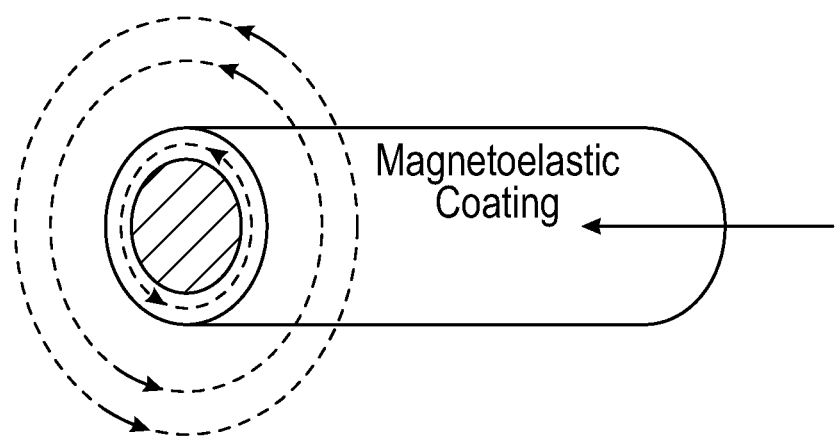

FIGS. 2A and 2B show inductance of a current-carrying conductor (FIG. 2A) or coating (FIG. 2B), specifically the internal and external inductance, which are due to the magnetic fields inside and external to, respectively, the current carrying conductor or coating. The internal inductance per unit length can be defined in Henry per meter $$\left[\frac{H}{m}\right]$$

as in Equation 1:

$$L_{int} = \frac{\mu_o \mu_r}{8\pi} \quad \text{Equation 1}$$

wherein: $\mu_o$ is the permeability of free space; and $\mu_r$ is the relative permeability of the material (or wire).

Unlike related art conductors, such as copper (Cu), when the sensing coil (e.g., the magnetoelastic antenna 120 of the RFID tag 100) includes (or is made of or coated with) a magnetoelastic material, the inductance of the sensor coil is directly affected by the change in permeability of the magnetoelastic material(s) of the sensor coil, which is caused by the applied strain. Thus, the antenna of the RFID tag 100 acts as both a strain sensor and an antenna, unlike related art RFID tags.

Magnetoelastic materials have been investigated for possible uses with strain sensors. In the related art examples, however, the magnetoelastic material is used as a magnetic core and a coil is wrapped around the magnetoelastic core or the coil is placed very near to the magnetoelastic core. In the related art examples, the magnetoelastic core is then mounted to a target object, and any changes in the inductance of the magnetoelastic core due to strain in the target object may be measured by the surrounding or adjacent coil.

According to embodiments of the present invention, however, the use of a magnetoelastic core and separate coil is replaced by the magnetoelastic material acting as the coil (e.g., the magnetoelastic antenna 120 in FIG. 1A) which can provide strain measurements based on the above-described internal inductance phenomenon (when the magnetoelastic material is used as the coil) or magnetic coupling phenomenon (when the magnetoelastic material is used as the substrate as will be described in more detail below).

Figure 1B:
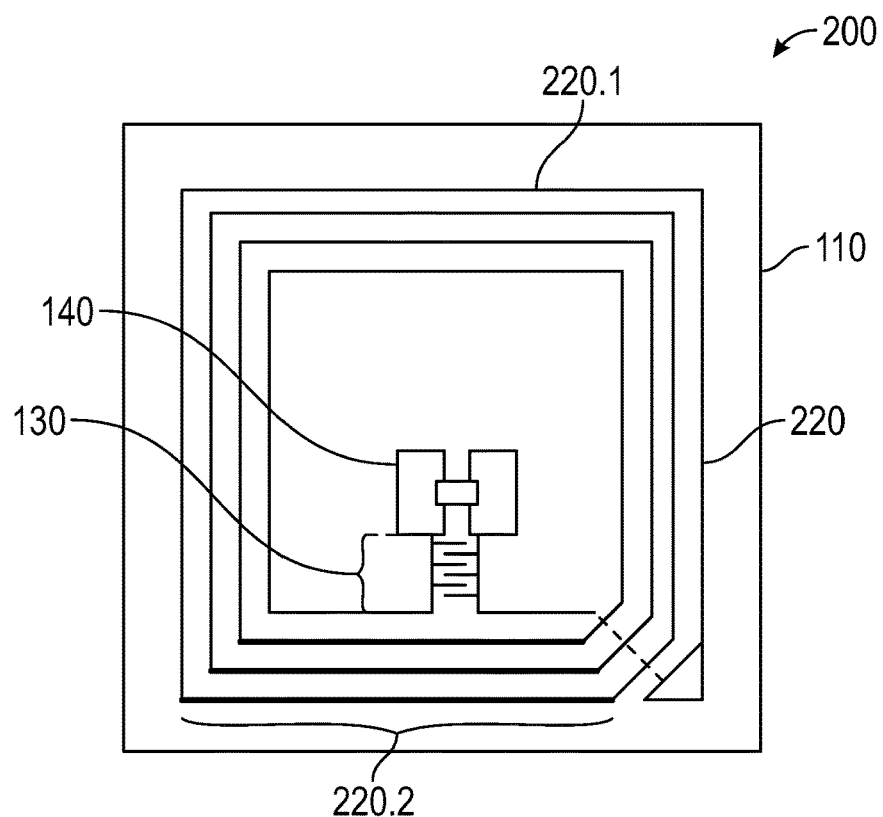
Figure 1C:
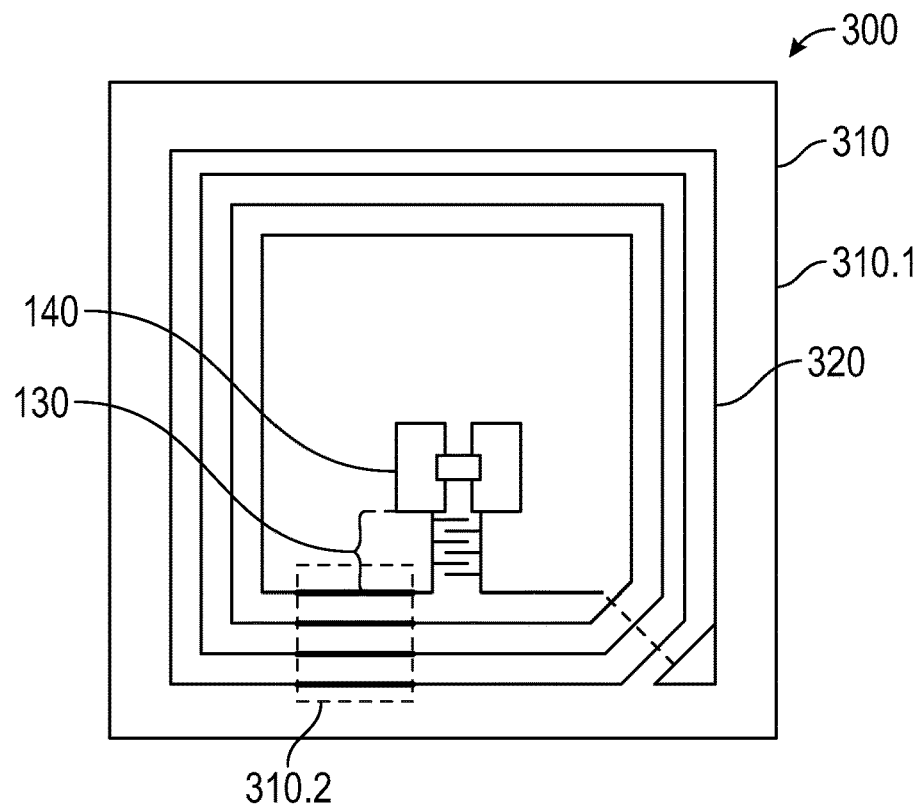
Figure 1D:
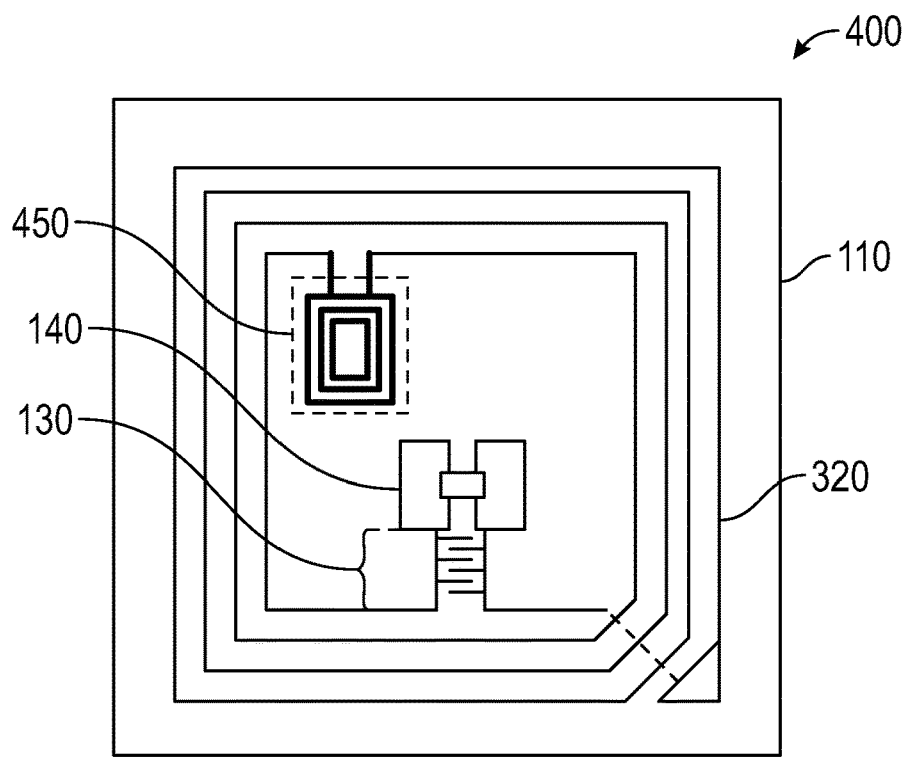

Other embodiments of strain-sensing RFID tags are shown in FIGS. 1B-1D. In FIG. 1B, a RFID tag 200 is similar to the RFID tag 100 shown in FIG. 1A but only a portion of the antenna 220 includes (or is formed of) the magnetoelastic material. For example, in the RFID tag 200, a portion (e.g., a first portion) of the antenna 220.1 may include (or may be formed of) a related art antenna material, such as copper (Cu), and another portion (e.g., the remaining portion or a second portion) of the antenna 220.2 may include (or may be formed of) a magnetoelastic material. In some embodiments, the magnetoelastic portion 220.2 of the antenna 220 indicates a portion of the antenna 220 that is coated by a magnetoelastic material. In such an embodiment, the antenna 220 may have a copper (Cu) base material and the second portion (e.g., the magnetoelastic portion) 220.2, or in some embodiments, all of the antenna 220, may be coated by a magnetoelastic material. As shown in FIG. 1B, the magnetoelastic portion 220.2 of the antenna 220 may be at one side (or along one edge) of the RFID tag 200, but the present invention is not limited thereto. In other embodiments, the magnetoelastic portion 220.2 of the antenna 220 may be sporadically located throughout the antenna 220, may be one ring of the antenna 220, etc.

In FIG. 1C, a RFID tag 300 is similar to the RFID tag 100 shown in FIG. 1A but a portion 310.2 of the substrate 310 includes (or is formed of) a magnetoelastic material. For example, a portion (e.g., a first portion) 310.1 of the substrate 310 is a non-conductive substrate including (or formed of), for example, FR-4 board, and the magnetoelastic portion (e.g., the second portion) 310.2 of the substrate 310 includes (or is formed of) a magnetoelastic material or is coated by a magnetoelastic material. The location of the magnetoelastic portion 310.2 within (or on) the substrate 310 is not particularly limited, but at least some of the magnetoelastic portion 310.2 of the substrate 310 should overlap the antenna 320. In this embodiment, the antenna 320 may be formed of (or may include) a convention antenna material, such as copper (Cu), and may or may not include (or be coated by) a magnetoelastic material.

In FIG. 1D, a RFID tag 400 includes a magnetoelastic sensing unit (e.g., a magnetoelastic sensor) 450. In this embodiment, the substrate 110 may be a non-conductive substrate, similar to the substrate 110 shown in FIG. 1A. The antenna 320 may include (or may be formed of) a related art conductor, such as copper (Cu), while the magnetoelastic sensing unit 450 may include a coil (e.g., one or more rings) of a magnetoelastic material. In some embodiments, the magnetoelastic sensing unit 450 may be formed separate from the substrate 110 and then attached to the substrate 110 and connected to the antenna 320, but the present invention is not limited thereto. In other embodiments, the magnetoelastic sensing unit 450 may be formed on (e.g., printed on) the substrate 110.

The antenna 320 may be connected to the magnetoelastic sensing unit 450 at a plurality (e.g., two) points. For example, a current in the antenna 320 may pass through the magnetoelastic sensing unit 450 as it travels along the antenna 320 and may not terminate in the magnetoelastic sensing unit 450. Because the antenna 320 is electrically connected to the magnetoelastic sensing unit 450, when electromagnetic waves are incident on the RFID tag 400 from a RFID reader, a change in the resonance frequency of the antenna 320 caused by the magnetoelastic sensing unit 450 may be read by the RFID reader.

Figure 2C:
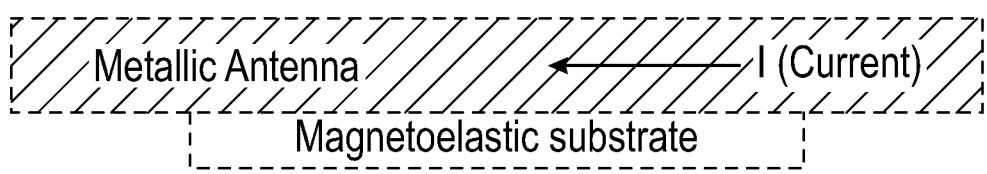

Different from the embodiments shown in FIGS. 1A and 1B, in which the antenna 110/210 includes (or is coated by) a magnetoelastic material, the embodiments shown in FIGS. 1C and 1D measure strain by using a slightly different principle. FIG. 2C shows a current-carrying antenna loop on a magnetoelastic substrate. Here, the strain-induced permeability change of the magnetoelastic substrate couples with the inductance of the antenna circuit, which then changes the resonance frequency of the antenna. The magnetoelastic substrate may be attached to (e.g., may be under) only a portion (but an electromagnetically sensitive portion) of the antenna loop to improve or maximize the performance and avoid potential loss due to eddy current. In some embodiments, a thin coating may be used to reduce the eddy current development in a transverse direction. The thin coating may have a thickness in a range from a few microns to a few millimeters, but the present invention is not limited thereto.

Figure 4A:
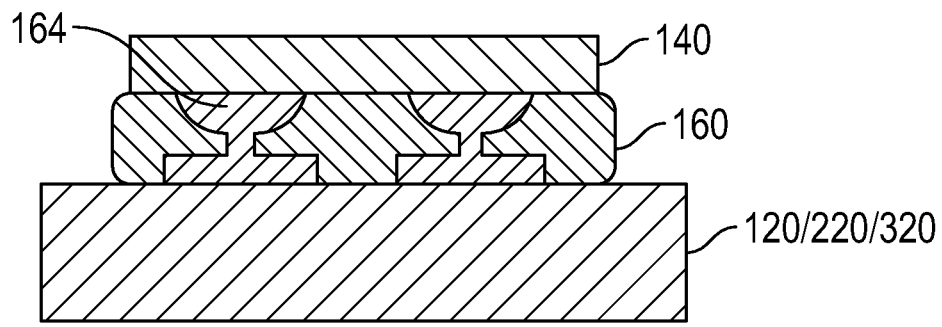
FIGS. 4A and 4B are cross-sectional view of portions of the RFID tags shown in FIGS. 1A-1D.
Figure 4B:
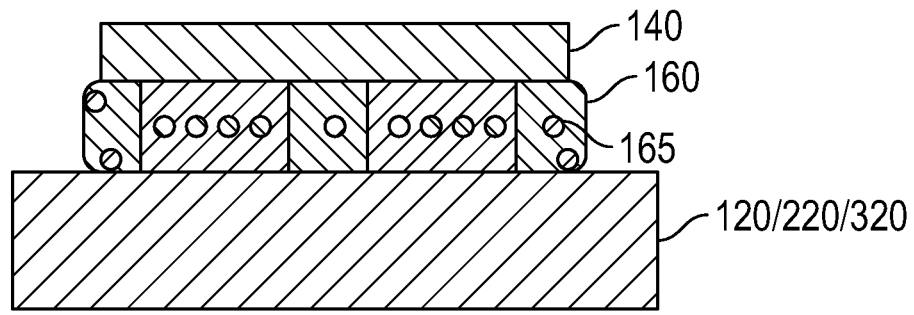

Referring to FIGS. 4A and 4B, different methods of bonding a RFID IC 140 to the antenna are shown. In both FIGS. 4A and 4B, an epoxy 160 may be the primary component physically bonding the RFID IC 140 onto the substrate. In FIG. 4A, conductive traces 164 are included in the epoxy 160, which may be referred to as a non-conductive adhesive (NCA), to electrically connect the RFID IC 140 to the antenna 120/220/320. In FIG. 4B, the epoxy 160 includes a plurality of conductive particles 165, which are schematically illustrated as being dispersed throughout the epoxy 160 for reference, which may be referred to as an anti-directional (or anisotropic) conductive adhesive (ACA).

Figure 7A:
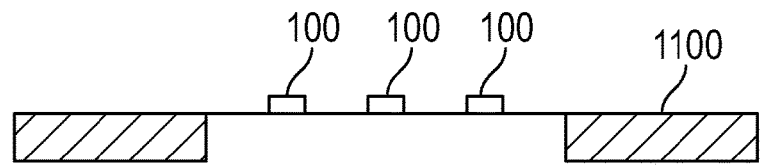
FIGS. 7A-7C show different use examples of the RFID tags according to embodiments of the present invention.
Figure 7B:
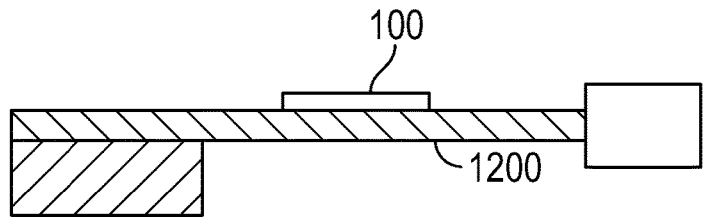
Figure 7C:
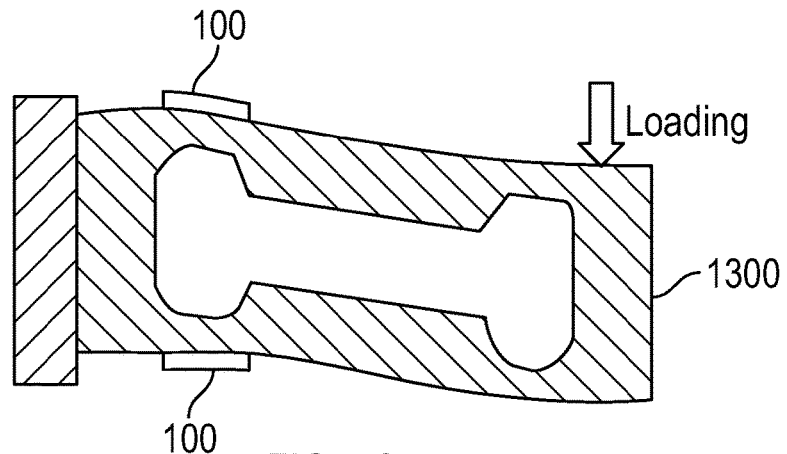

Referring to FIGS. 7A-7C, some example applications of the RFID tag 100 are shown. While the RFID tag 100 is referenced in the examples shown in FIGS. 5A-7C, it should be understood that any of the RFID tags 100/200/300/400 may be used in place of the RFID tag 100 shown in these figures.

Referring to FIG. 7A, one or more strain-sensing RFID tags 100 may be placed on (e.g., adhered to) an acoustic sensor 1100. Referring to FIG. 7B, one or more strain-sensing RFID tags 100 may be placed on (e.g., adhered to) an accelerometer 1200. Referring to FIG. 7C, one or more stain-sensing RFID tags 100 may be placed on (e.g., adhered to) a load cell 1300.

Figure 8A:
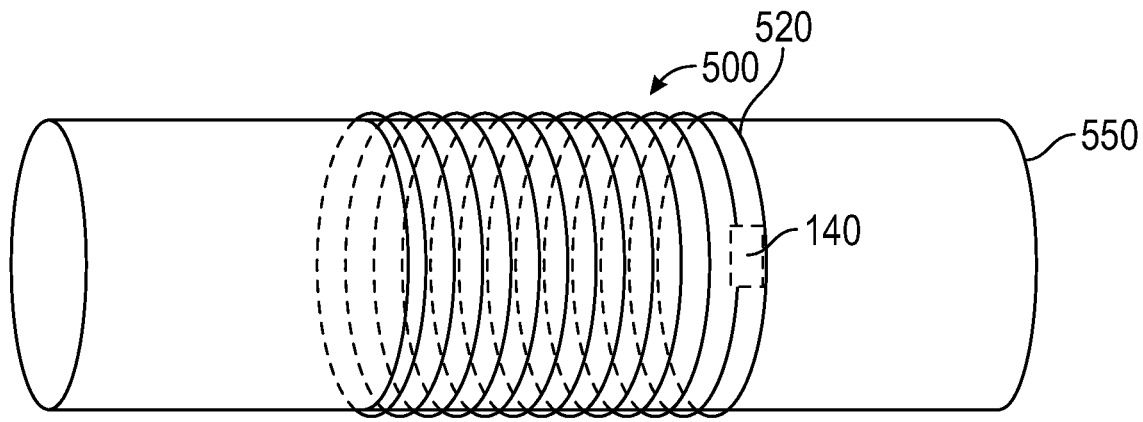
FIGS. 8A and 8B show other example embodiments of a RFID tag according to an embodiment of the present invention.
Figure 8B:
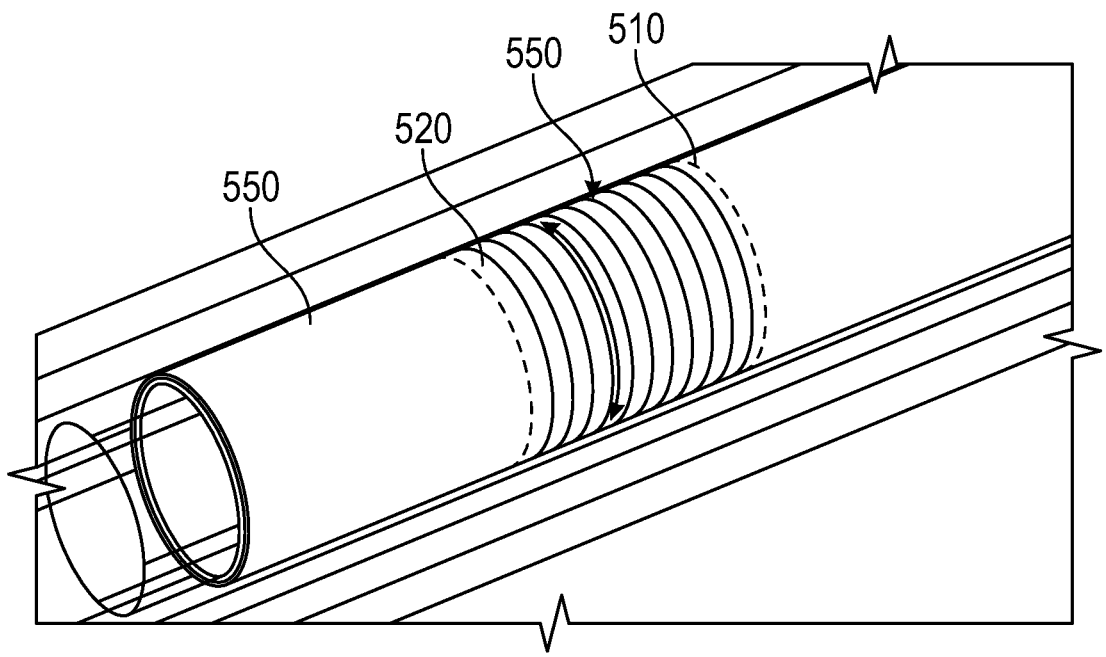

Referring to FIGS. 8A and 8B, according to other embodiments of the present invention, a RFID tag 500 may be formed around a cylindrical pipe or tube. The RFID tag 500 may be similar to the above-described RFID tags 100/200/300/400 but instead of a planar antenna, the antenna 520 may be wrapped around a pipe (or tube, etc.) 550. In the embodiment shown in FIG. 8A, no substrate is shown. However, if the pipe 550 is made of (or includes) an electrically conductive material, a non-conductive substrate 510 may be included between the pipe 550 and the antenna 520 (see, e.g., FIG. 8B). Further, the RFID IC 140 may be included on the pipe 550 and connected to the antenna 520.

Similar to the above-described RFID tags 100/200/300/400, in the RFID tag 500, the antenna 520 may include (or may be formed of) or may be entirely or partially coated by a magnetoelastic material. In some embodiments, the antenna 520 may be formed of a related art conductive material, such as copper (Cu) and a portion of the substrate 510 may be formed of (or may include) a magnetoelastic material, or a magnetoelastic sensor unit may be formed on the pipe 550. The RFID tag 500 may monitor the strain of a pressurized pipe, which may indicate the pressure of a fluid in the pipe 550.

In the above example embodiments of the present invention, the RFID IC 140 is included, but the present invention is not limited thereto. The RFID IC 140 is primarily included to provide an identification signal to differentiate signals from each other when a plurality of RFID tags are used in close proximity to each other. In other embodiments, the magnetoelastic strain sensor (e.g., the magnetoelastic coil) may be used without a RFID IC with a corresponding lack of identification signal.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a magnetoelastic strain sensor and a radio-frequency identification (RFID) tag including the magnetoelastic strain sensor have been described and illustrated herein, many modifications and variations within those embodiments will be apparent to those skilled in the art. Accordingly, it is to be understood that a magnetoelastic strain sensor and a RFID tag including the magnetoelastic strain sensor according to the present invention may be embodied in forms other than as described herein without departing from the spirit and scope of the present invention. The present invention is defined by the following claims and equivalents thereof.

What is claimed is:

1. A wireless radio-frequency identification (RFID) strain sensor comprising:
    a substrate;
    an antenna on the substrate, the antenna comprising a conductive metal and a magnetoelastic material coated on at least a portion of the conductive metal, the conductive metal being configured as a loop; and
    an integrated circuit on the substrate and electrically connected to the antenna.

2. The RFID strain sensor of claim 1, wherein the magnetoelastic material comprises Terfenol-D ($Tb_xDy_{1-x}Fe_2$ (x~0.3)), galfenol, alfenol, Metglas ($Fe_{81}Si_{3.5}B_{13.5}C_2$), cobalt ferrite ($CoFe_2O_4$), and/or nickel (Ni).

3. The RFID strain sensor of claim 1, wherein the substrate comprises an electrically non-conductive material.

4. The RFID strain sensor of claim 3, wherein the electrically non-conductive material comprises polymers, ceramics, and/or glass-reinforced epoxy.

5. The RFID strain sensor of claim 3, wherein a first portion of the substrate comprises the electrically non-conductive material, and
    wherein a second portion of the substrate comprises a magnetoelastic material.

6. The RFID strain sensor of claim 5, wherein the antenna extends over the second portion of the substrate.

7. The RFID strain sensor of claim 1, further comprising a capacitor electrically connected between the antenna and the integrated circuit.

8. The RFID strain sensor of claim 1, wherein the antenna is planar.

9. A radio-frequency identification (RFID) strain sensor comprising:
    a substrate;
    an antenna on the substrate, the antenna comprising a conductive metal configured as a loop, a magnetoelastic material being coated on at least a portion of the conductive metal; and
    an integrated circuit on the substrate and electrically connected to the antenna.

10. The RFID strain sensor of claim 9, wherein the conductive metal is configured as a plurality of rings.

11. The RFID strain sensor of claim 9, further comprising a capacitor electrically connected between the antenna and the integrated circuit.

12. A wireless radio-frequency identification (RFID) strain sensor comprising:
    a substrate;
    a cylindrical antenna on the substrate, the antenna comprising a conductive metal and a magnetoelastic material coated on at least a portion of the conductive metal, the conductive metal being configured as a cylindrical loop; and an integrated circuit electrically connected to the antenna.

13. The RFID strain sensor of claim 12, wherein the conductive metal is in solenoidal form.

14. The RFID strain sensor of claim 13, wherein the antenna is on an outer surface of the substrate.

15. The RFID strain sensor of claim 14, wherein the substrate has a cylindrical cross-section.

16. The RFID strain sensor of claim 15, wherein the substrate is configured to be fitted around a pipe.

* * * * *